United States Patent
Chen et al.

(10) Patent No.: US 11,262,532 B2
(45) Date of Patent: Mar. 1, 2022

(54) CAMERA OPTICAL LENS

(71) Applicant: AAC Optics Solutions Pte. Ltd., Singapore (SG)

(72) Inventors: Chenxiyang Chen, Shenzhen (CN); Lei Zhang, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 229 days.

(21) Appl. No.: 16/679,241

(22) Filed: Nov. 10, 2019

(65) Prior Publication Data
US 2020/0409044 A1    Dec. 31, 2020

(30) Foreign Application Priority Data
Jun. 30, 2019 (CN) .......................... 201910582031.5

(51) Int. Cl.
*G02B 9/62* (2006.01)
*G02B 13/00* (2006.01)
*G02B 27/00* (2006.01)
*H04N 5/225* (2006.01)

(52) U.S. Cl.
CPC ........... *G02B 9/62* (2013.01); *G02B 13/0045* (2013.01); *G02B 27/0012* (2013.01); *H04N 5/2254* (2013.01)

(58) Field of Classification Search
CPC ...... G02B 27/0012; G02B 3/04; G02B 13/18; G02B 13/0045; G02B 9/62; G02B 9/64; H04N 5/2254
USPC ................................ 359/713, 756, 757, 759
See application file for complete search history.

(56) References Cited

U.S. PATENT DOCUMENTS

| | | | |
|---|---|---|---|
| 2016/0124186 A1* | 5/2016 | Tang | G02B 13/0045 359/713 |
| 2018/0045913 A1* | 2/2018 | Hsueh | G02B 9/62 |
| 2018/0074294 A1* | 3/2018 | Hsueh | G02B 13/0045 |

* cited by examiner

Primary Examiner — Travis S Fissel
(74) Attorney, Agent, or Firm — W&G Law Group

(57) ABSTRACT

The present disclosure relates to optical lens, in particular to a camera optical lens, comprising, from an object side to an image side in sequence: a first lens, a second lens, a third lens, a fourth lens, a fifth lens and a sixth lens; the second lens has a negative refractive power, and the third lens has a positive refractive power; wherein the camera optical lens satisfies the following conditions: $1.30 \leq f1/f \leq 2.00$; $13.00 \leq R7/d7 \leq 16.00$, where f denotes a focus length of the camera optical lens; f1 denotes a focus length of the first lens; R7 denotes a curvature radius of an object side surface of the fourth lens; and d7 denotes an on-axis thickness of the fourth lens is d7. The camera optical lens may obtain high imaging performance and a low TTL.

19 Claims, 7 Drawing Sheets

CAMERA OPTICAL LENS

TECHNICAL FIELD

The present disclosure generally relates to optical lens, in particular to a camera optical lens suitable for handheld terminals, such as smart phones and digital cameras, and imaging devices, such as monitors or PC lens.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market. In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece, six-piece and seven-piece lens structure gradually appear in lens designs. There is an urgent need for ultra-thin wide-angle camera lenses which with good optical characteristics and fully corrected chromatic aberration.

BRIEF DESCRIPTION OF THE DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF EMBODIMENTS

To make the objects, technical solutions, and advantages of the present disclosure clearer, the embodiments of the present disclosure are described in detail with reference to the accompanying drawings as follows. A person of ordinary skill in the related art would understand that, in the embodiments of the present disclosure, many technical details are provided to make readers better understand this application. However, the technical solutions sought to be protected by this application could be implemented, even without these technical details and any changes and modifications based on the following embodiments.

Embodiment 1

Figure 1:
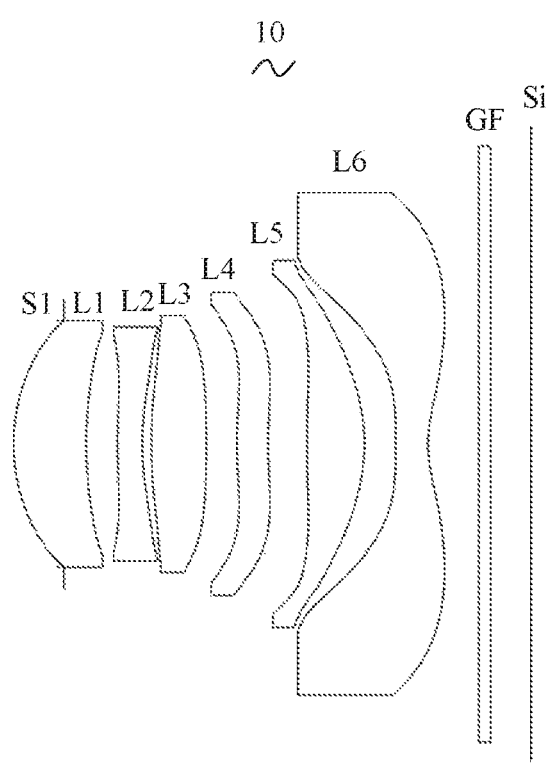
FIG. 1 is a schematic diagram of a structure of a camera optical lens in accordance with Embodiment 1 of the present disclosure.

As shown in the accompanying drawings, the present disclosure provides a camera optical lens 10. FIG. 1 shows the camera optical lens 10 of Embodiment 1 of the present disclosure, the camera optical lens 10 comprises six lenses. Specifically, the camera optical lens 10 comprises in sequence from an object side to an image side: an aperture S1, a first lens L1, a second lens L2, a third lens L3, a fourth lens L4, a fifth lens L5 and a sixth lens L6. An optical element like an optical filter GF may be arranged between the sixth lens L6 and an image surface Si.

The first lens L1, the second lens L2, the third lens L3, the fourth lens L4, the fifth lens L5 and the sixth lens L6 are all made of plastic material.

The second lens L2 has a negative refractive power, and the third lens L3 has a positive refractive power.

Herein, a total optical length from an object side surface of the first lens to an image surface of the camera optical lens along an optical axis defined as TTL, a focal length of the whole camera optical lens 10 is defined as f, and a focal length of the first lens defined as f1. The camera optical lens 10 satisfies the following condition: $1.30 \leq f1/f \leq 2.00$, which specifies the positive refractive power of the first lens. If the specified lower limit value is exceeded, a very strong positive refractive power of the first lens L1 is obtained, which, though is advantageous for the lens to be thin, would make it difficult to correct aberrations and the like, and it is not good for the lens to be developed towards a wide angle as well. On the contrary, if the specified upper limit value is exceeded, the positive refractive power of the first lens would become too weak, and it is difficult for the lens to be developed toward ultra-thinning. Preferably, the camera optical lens 10 further satisfies the following condition: $1.32 \leq f1/f \leq 1.98$.

A curvature radius of an object side surface of the fourth lens L4 is defined as R7, and an on-axis thickness of the fourth lens L4 is defined as d7. The camera optical lens 10 further satisfies the following condition: $13.00 \leq R7/d7 \leq 16.00$. By controlling the refractive power of the fourth lens L4 to be within a reasonable range, correction of the aberration of the optical system can be facilitated. Preferably, the camera optical lens 10 further satisfies the following condition: $13.25 \leq R7/d7 \leq 15.79$.

When the focus length f of the camera optical lens 10, the focus length f1 of the first lens L1, and the curvature radius R7 of the object side surface of the fourth lens L4, and the on-axis thickness d7 of the fourth lens L4 satisfy the above conditions, the camera optical lens 10 has a high performance and satisfies a design requirement of low TTL.

In this embodiment, the object side surface of the first lens L1 is convex in a paraxial region and the image side surface thereof is concave in the paraxial region, and the first lens L1 has a positive refractive power.

A curvature radius of the object side surface of the first lens L1 is defined as R1, the curvature radius of the image side surface of the first lens L1 is defined as R2, and the camera optical lens further satisfies the following condition: $-8.52 \le (R1+R2)/(R1-R2) \le -1.81$, thus the shape of the first lens is reasonably controlled, so that the first lens may effectively correct system spherical aberration. Preferably, the camera optical lens further satisfies the following condition: $-5.33 \le (R1+R2)/(R1-R2) \le -2.27$.

An on-axis thickness of the first lens L1 is defined as d1, the total optical length from an object side surface of the first lens to an image surface of the camera optical lens along an optical axis defined as TTL, and the camera optical lens 10 further satisfies the following condition: $0.07 \le d1/TTL \le 0.22$, thus the shape of the first lens is reasonably controlled, which is beneficial for realization of ultra-thin lenses. Preferably, the camera optical lens 10 further satisfies the following condition: $0.11 \le d1/TTL \le 0.17$.

In this embodiment, an object side surface of the second lens L2 is convex in a paraxial region, and the image side surface thereof is concave in the paraxial region.

The focal length of the camera optical lens 10 is defined as f, a focal length of the second lens L2 is defined as f2, and the camera optical lens 10 further satisfies the following condition: $-6.39 \le f2/f \le -1.19$. It is beneficial for correcting aberration of an optical system by controlling a negative refractive power of the second lens L2 within a reasonable range. Preferably, the camera optical lens 10 further satisfies the following condition: $-3.99 \le f2/f \le -1.49$.

A curvature radius of the object side surface of the second lens L2 is defined as R3, a curvature radius of the image side surface of the second lens L2 is defined as R4, and the camera optical lens 10 further satisfies the following condition: $1.39 \le (R3+R4)/(R3-R4) \le 7.19$, which specifies a shape of the second lens L2. When the value is with this range, a development towards ultra-thin and wide-angle lenses would facilitate correcting the problem of an on-axis chromatic aberration. Preferably, the camera optical lens 10 further satisfies the following condition: $2.23 \le (R3+R4)/(R3-R4) \le 5.75$.

An on-axis thickness of the second lens L2 is defined as d3, the total optical length from the object side surface of the first lens to an image surface of the camera optical lens along an optical axis is defined as TTL, and the camera optical lens 10 further satisfies the following condition: $0.02 \le d3/TTL \le 0.07$. When the above condition is satisfied, it is beneficial for realization of ultra-thin lenses. Preferably, the camera optical lens 10 further satisfies the following condition: $0.04 \le d3/TTL \le 0.06$.

In this embodiment, an object side surface of the third lens L3 is convex in a paraxial region, and an image side surface thereof is convex in the paraxial region.

The focal length of the camera optical lens 10 is defined as f, the focal length of the third lens L3 is defined as f3, and the camera optical lens 10 further satisfies the following condition: $0.78 \le f3/f \le 3.37$. An appropriate distribution of the refractive power leads to a better imaging quality and a lower sensitivity. Preferably, the camera optical lens 10 further satisfies the following condition: $1.25 \le f3/f \le 2.70$.

A curvature radius of the object side surface of the third lens L3 is defined as R5, a curvature radius of the image side surface of the third lens L3 is defined as R6, and the camera optical lens 10 satisfies the following condition: $-1.12 \le (R5+R6)/(R5-R6) \le 0.82$, which may effectively control the shape of the third lens L3 and thus is beneficial for the shaping of the third lens L3 as well as avoiding bad shaping and stress generation due to extra-large surface curvature of the third lens L3. Preferably, the camera optical lens 10 further satisfies the following condition: $-0.70 \le (R5+R6)/(R5-R6) \le 0.65$.

An on-axis thickness of the third lens L3 is defined as d5, the total optical length from the object side surface of the first lens to an image surface of the camera optical lens along an optical axis is defined as TTL, and the camera optical lens 10 further satisfies the following condition: $0.05 \le d5/TTL \le 0.18$. In this way, it is beneficial for the realization of ultra-thin lenses. Preferably, the camera optical lens 10 further satisfies the following condition: $0.08 \le d5/TTL \le 0.15$.

In this embodiment, an object side surface of the fourth lens L4 is convex in a paraxial region and an image side surface of the fourth lens L4 is concave in the paraxial region, and the fourth lens L4 has a positive refractive power.

The focal length of the whole camera optical lens 10 is defined as f, the focal length of the fourth lens L4 is defined as f4, and the camera optical lens 10 further satisfies the following condition: $5.07 \le f4/f \le 48.82$. An appropriate distribution of the refractive power leads to a better imaging quality and a lower sensitivity. Preferably, the camera optical lens 10 further satisfies the following condition: $8.12 \le f4/f \le 39.06$.

A curvature radius of the object side surface of the fourth lens L4 is defined as R7, a curvature radius of an image side surface of the fourth lens L4 is defined as R8, and the camera optical lens 10 further satisfies the following condition: $-240.44 \le (R7+R8)/(R7-R8) \le -9.42$, which specify a shape of the fourth lens L4. When the value is within this range, a development towards ultra-thin and wide-angle lenses would facilitate solving problems, like correcting aberration of the off-axis picture angle. Preferably, the camera optical lens 10 further satisfies the following condition: $-150.27 \le (R7+R8)/(R7-R8) \le -11.77$.

An on-axis thickness of the fourth lens L4 is defined as d7, the total optical length from the object side surface of the first lens to an image surface of the camera optical lens along an optical axis is defined as TTL, and the camera optical lens 10 further satisfies the following condition: $0.02 \le d7/TTL \le 0.09$. In this way, it is beneficial for the realization of ultra-thin lenses. Preferably, the camera optical lens 10 further satisfies the following condition: $0.03 \le d7/TTL \le 0.07$.

In this embodiment, an image side surface of the fifth lens L5 is convex in a paraxial region, and the fifth lens L5 has a positive refractive power.

The focal length of the whole camera optical lens 10 is defined as f, a focal length of the fifth lens L5 is defined as f5, and the camera optical lens 10 further satisfies the following condition: $0.32 \le f5/f \le 1.02$. This definition for the fifth lens L5 may effectively flatten a light angle of the camera lens and reduce tolerance sensitivity. Preferably, the camera optical lens 10 further satisfies the following condition: $0.52 \le f5/f \le 0.82$.

A curvature radius of the object side surface of the fifth lens L5 is defined as R9, a curvature radius of the image side surface of the fifth lens L5 is defined as R10, and the camera optical lens 10 further satisfies the following condition: $0.41 \le (R9+R10)/(R9-R10) \le 1.51$, which specifies the shape of the fifth lens L5. When the value is within this range, with the development into the direction of ultra-thin and wide-angle lens, it is beneficial for solving the problem like an off-axis aberration. Preferably, the camera optical lens 10 further satisfies the following condition: $0.65 \leq (R9+R10)/(R9-R10) \leq 1.20$.

An on-axis thickness of the fifth lens L5 is defined as d9, the total optical length from the object side surface of the first lens to an image surface of the camera optical lens along an optical axis is defined as TTL, and the camera optical lens 10 further satisfies the following condition: $0.06 \leq d9/TTL \leq 0.24$. In this way, it is beneficial for realization of ultra-thin lenses. Preferably, the camera optical lens 10 further satisfies the following condition: $0.09 \leq d9/TTL \leq 0.19$.

In this embodiment, an object side surface of the sixth lens L6 is concave in a paraxial region, an image side surface of the sixth lens L6 is concave in the paraxial region, and the sixth lens L6 has a negative refractive power.

The focal length of the whole camera optical lens 10 is defined as f, a focal length of the sixth lens L6 is defined as f6, and the camera optical lens 10 further satisfies the following condition: $-1.06 \leq f6/f \leq -0.34$. An appropriate distribution of the refractive power leads to a better imaging quality and a lower sensitivity. Preferably, the camera optical lens 10 further satisfies the following condition: $-0.66 \leq f6/f \leq -0.42$.

A curvature radius of the object side surface of the sixth lens L6 is defined as R11, a curvature radius of the image side surface of the sixth lens L6 is defined as R12, and the camera optical lens 10 further satisfies the following condition: $0.41 \leq (R11+R12)/(R11-R12) \leq 1.24$, which specifies the shape of the sixth lens L6. When the value is within this range, with the development into the direction of ultra-thin and wide-angle lenses, it is beneficial for solving a problem like the off-axis aberration. Preferably, the camera optical lens 10 further satisfies the following condition: $0.66 \leq (R11+R12)/(R11-R12) \leq 0.99$.

An on-axis thickness of the sixth lens L6 is defined as d11, the total optical length from the object side surface of the first lens to an image surface of the camera optical lens along an optical axis is defined as TTL, and the camera optical lens 10 further satisfies the following condition: $0.03 \leq d11/TTL \leq 0.10$. In this way, it is beneficial for realization of ultra-thin lenses. Preferably, the camera optical lens 10 further satisfies the following condition: $0.05 \leq d11/TTL \leq 0.08$.

In this embodiment, the focal length of the whole camera optical lens is defined as f, a combined focal length of the first lens and of the second lens is defined as f12, and the camera optical lens 10 satisfies the following condition: $1.11 \leq f12/f \leq 6.89$. In this way, aberration and distortion of a camera optical lens may be removed, and a back focal length of the camera optical lens may be reduced, such that miniaturization of an imaging lens system group is maintained. Preferably, the following condition shall be satisfied: $1.78 \leq f12/f \leq 5.51$.

In this embodiment, the total optical length TTL of the camera optical lens 10 is less than or equal to 5.28 mm, which is beneficial for realization of ultra-thin lenses. Preferably, the total optical length TTL of the camera optical lens 10 is less than or equal to 5.04 mm.

In this embodiment, the camera optical lens 10 has a large aperture, an F number of the aperture is less than or equal to 1.74, which has better imaging performance. Preferably, the F number of the camera optical lens 10 is less than or equal to 1.71.

With such design, the total optical length TTL of the whole camera optical lens 10 may be made as short as possible, thus the miniaturization characteristics is maintained.

In the following, an example will be taken to describe the camera optical lens 10 of the present disclosure. The symbols recorded in each example are as follows. The unit of the focal length, the on-axis distance, the curvature radius, the on-axis thickness, an inflexion point position and an arrest point position is mm.

TTL: Optical length (the total optical length from the object side surface of the first lens to the image surface of the camera optical lens along the optic axis) in mm.

Preferably, inflexion points and/or arrest points can be arranged on the object side surface and/or image side surface of the lens, so as to satisfy the demand for the high quality imaging. The description below can be referred to for specific implementations.

The design information of the camera optical lens 10 in Embodiment 1 of the present disclosure is shown in Tables 1 and 2.

TABLE 1

|     | R       | d     |        | nd     |     | vd    |
|-----|---------|-------|--------|--------|-----|-------|
| S1  | ∞       | d0=   | −0.463 |        |     |       |
| R1  | 1.699   | d1=   | 0.673  | nd1    | 1.5467 v1 | 55.82 |
| R2  | 3.674   | d2=   | 0.289  |        |     |       |
| R3  | 4.934   | d3=   | 0.230  | nd2    | 1.6686 v2 | 20.53 |
| R4  | 2.330   | d4=   | 0.084  |        |     |       |
| R5  | 4.549   | d5=   | 0.510  | nd3    | 1.5467 v3 | 55.82 |
| R6  | −16.172 | d6=   | 0.284  |        |     |       |
| R7  | 3.915   | d7=   | 0.289  | nd4    | 1.6422 v4 | 23.83 |
| R8  | 4.511   | d8=   | 0.368  |        |     |       |
| R9  | 15.414  | d9=   | 0.531  | nd5    | 1.5467 v5 | 55.82 |
| R10 | −1.544  | d10=  | 0.290  |        |     |       |
| R11 | −11.978 | d11=  | 0.300  | nd6    | 1.5375 v6 | 56.12 |
| R12 | 1.143   | d12=  | 0.470  |        |     |       |
| R13 | ∞       | d13=  | 0.110  | ndg    | 1.5168 vg | 64.17 |
| R14 | ∞       | d14=  | 0.373  |        |     |       |

In the table, meanings of various symbols will be described as follows.

S1: aperture;

R: curvature radius of an optical surface, a central curvature radius for a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6;
R13: curvature radius of an object side surface of the optical filter GF;
R14: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the optical filter GF;
d13: on-axis thickness of the optical filter GF;
d14: on-axis distance from the image side surface of the optical filter GF to the image surface;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF.

Table 2 shows aspherical surface data of the camera optical lens 10 in Embodiment 1 of the present disclosure.

TABLE 2

| | Conic Coefficient | Aspherical Surface Coefficients | | | | |
|---|---|---|---|---|---|---|
| | k | A4 | A6 | A8 | A10 | A12 |
| R1  | 8.7603E−02  | 1.0251E−03  | 5.0929E−04  | 5.4742E−02  | −2.4486E−01 | 6.0332E−01 |
| R2  | 5.6571E+00  | −3.5852E−02 | −2.5346E−03 | 5.4786E−02  | −1.3106E−01 | 2.1466E−01 |
| R3  | 1.0781E+01  | −2.1973E−01 | 7.4965E−02  | −1.5620E−01 | 7.5475E−01  | −1.6863E+00 |
| R4  | −1.2212E+01 | −4.9209E−02 | −2.8476E−02 | −1.2723E−01 | 8.5940E−01  | −1.9772E+00 |
| R5  | −8.1785E+01 | 1.0524E−01  | −1.7178E−01 | 5.9662E−03  | 4.5803E−01  | −1.3669E+00 |
| R6  | −5.4035E+01 | −1.0909E−01 | 1.0517E−01  | −1.6651E−01 | 1.6847E−01  | −1.9220E−01 |
| R7  | −3.3723E+01 | −1.5808E−01 | −3.4899E−02 | 2.1590E−01  | −5.4066E−01 | 8.7078E−01 |
| R8  | −7.3545E+01 | −8.8969E−02 | −2.2048E−01 | 5.4704E−01  | −8.8698E−01 | 1.0198E+00 |
| R9  | −8.8799E+01 | 3.8630E−02  | −2.2587E−01 | 3.9628E−01  | −6.1283E−01 | 7.1412E−01 |
| R10 | −1.6062E+00 | 1.9193E−01  | −4.7367E−01 | 8.6611E−01  | −1.2307E+00 | 1.2134E+00 |
| R11 | 3.5529E+01  | −1.0071E+00 | 2.7931E−01  | −2.1170E−02 | 1.8980E−02  | −1.1556E−02 |
| R12 | −7.2124E+00 | −2.3506E−01 | 2.2839E−01  | −1.5848E−01 | 7.7864E−02  | −2.6764E−02 |

| | Aspherical Surface Coefficients | | | |
|---|---|---|---|---|
| | A14 | A16 | A18 | A20 |
| R1  | −8.4612E−01 | 6.9156E−01  | −3.0629E−01 | 5.7525E−02 |
| R2  | −2.3039E−01 | 1.9008E−01  | −1.1467E−01 | 3.7759E−02 |
| R3  | 2.1870E+00  | −1.7497E+00 | 8.0795E−01  | −1.6615E−01 |
| R4  | 2.7628E+00  | −2.4428E+00 | 1.2509E+00  | −2.7855E−01 |
| R5  | 2.3169E+00  | −2.3411E+00 | 1.2980E+00  | −2.9803E−01 |
| R6  | 1.8411E−01  | −1.0938E−01 | 3.5411E−02  | −4.0606E−03 |
| R7  | −9.6579E−01 | 6.6945E−01  | −2.4906E−01 | 3.7499E−02 |
| R8  | −8.1313E−01 | 4.1600E−01  | −1.1978E−01 | 1.4598E−02 |
| R9  | −5.2883E−01 | 2.2973E−01  | −5.3649E−02 | 5.2205E−03 |
| R10 | −7.5358E−01 | 2.7600E−01  | −5.4137E−02 | 4.3768E−03 |
| R11 | −4.9813E−03 | 4.9100E−04  | 1.9400E−03  | 7.0181E−04 |
| R12 | 6.1789E−03  | −9.0166E−04 | 7.4527E−05  | −2.6442E−06 |

Among them, K is a conic index, A4, A6, A8, A10, A12, A14, A16, A18 and A20 are aspheric surface indexes.

IH: Image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

For convenience, an aspheric surface of each lens surface uses the aspheric surfaces shown in the above formula (1). However, the present disclosure is not limited to the aspherical polynomials form shown in the formula (1).

Table 3 and table 4 show design data of inflexion points and arrest points of the camera optical lens 10 lens in Embodiment 1 of the present disclosure. In which, P1R1 and P1R2 represent respectively the object side surface and the image side surface of the first lens L1, P2R1 and P2R2 represent respectively the object side surface and the image side surface of the second lens L2, P3R1 and P3R2 represent respectively the object side surface and the image side surface of the third lens L3, P4R1 and P4R2 represent respectively the object side surface and the image side surface of the fourth lens L4, P5R1 and P5R2 represent respectively the object side surface and the image side surface of the fifth lens L5, P6R1 and P6R2 represent respectively the object side surface and the image side surface of the sixth lens L6. The data in the column named "inflexion point position" refers to vertical distances from the inflexion points arranged on each lens surface to the optic axis of the camera optical lens 10. The data in the column named "arrest point position" refers to the vertical distances from the arrest points arranged on each lens surface to the optic axis of the camera optical lens 10.

TABLE 3

| | Number of inflexion points | Inflexion point position 1 | Inflexion point position 2 |
|---|---|---|---|
| P1R1 | 0 | 0 | 0 |
| P1R2 | 0 | 0 | 0 |
| P2R1 | 1 | 0.305 | 0 |
| P2R2 | 2 | 0.575 | 0.725 |
| P3R1 | 2 | 0.635 | 0.935 |
| P3R2 | 1 | 1.115 | 0 |
| P4R1 | 2 | 0.325 | 1.265 |
| P4R2 | 2 | 0.315 | 1.315 |
| P5R1 | 2 | 0.445 | 1.515 |
| P5R2 | 1 | 1.405 | 0 |
| P6R1 | 1 | 1.375 | 0 |
| P6R2 | 1 | 0.435 | 0 |

TABLE 4

| | Number of arrest points | Arrest point position 1 |
|---|---|---|
| P1R1 | 0 | 0 |
| P1R2 | 0 | 0 |
| P2R1 | 1 | 0.535 |
| P2R2 | 0 | 0 |
| P3R1 | 0 | 0 |
| P3R2 | 0 | 0 |
| P4R1 | 1 | 0.565 |
| P4R2 | 1 | 0.545 |
| P5R1 | 1 | 0.675 |
| P5R2 | 0 | 0 |
| P6R1 | 0 | 0 |
| P6R2 | 1 | 1.145 |

Figure 2:
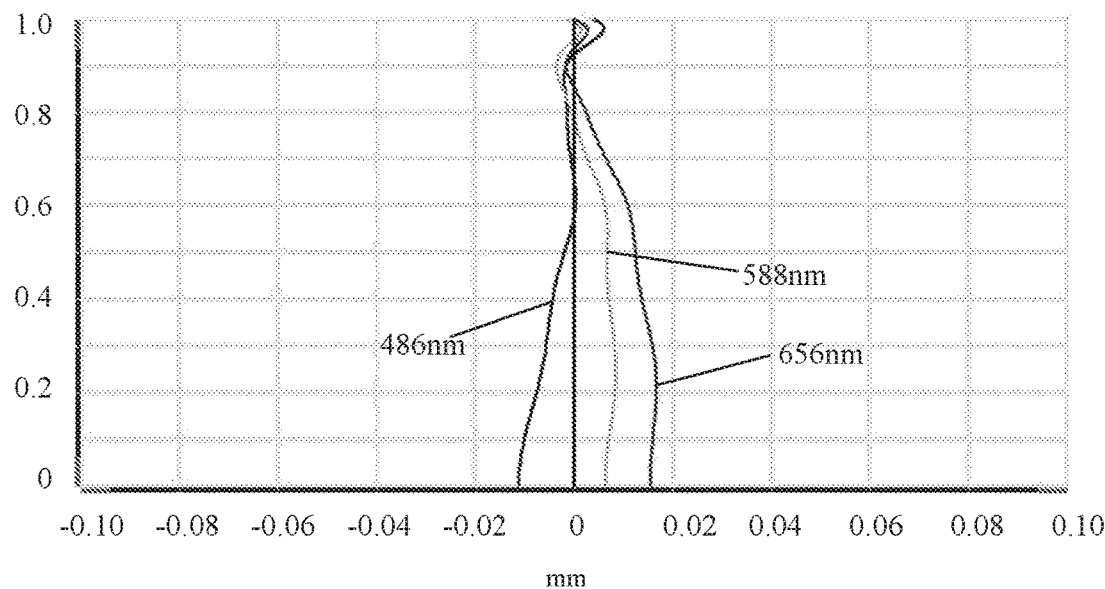
FIG. 2 is a schematic diagram of a longitudinal aberration of the camera optical lens shown in FIG. 1.
Figure 3:
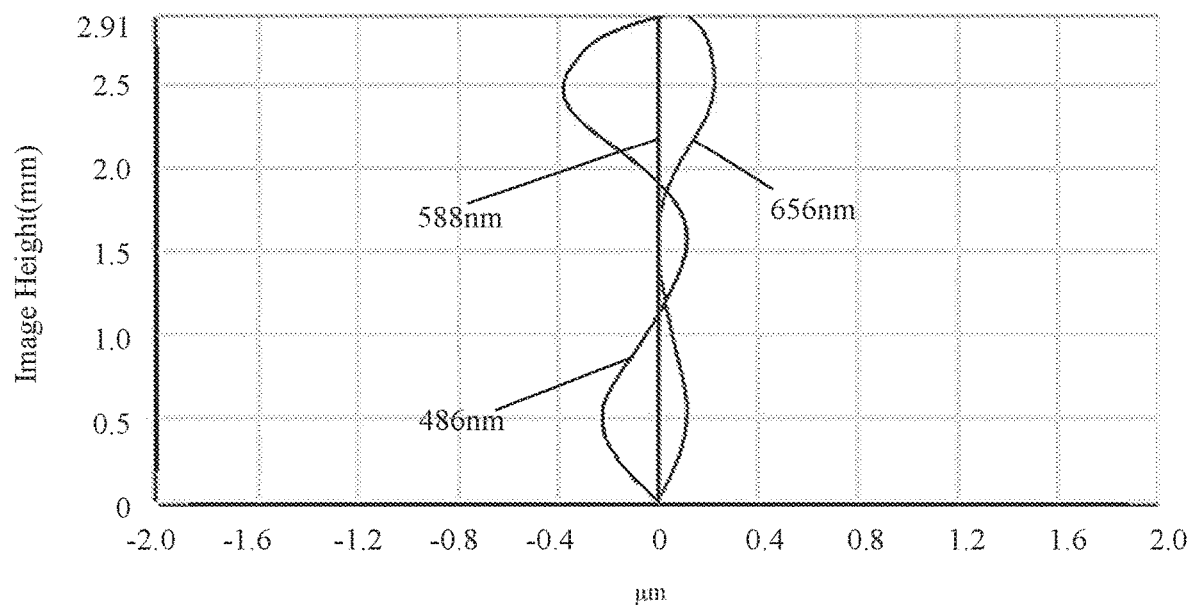
FIG. 3 is a schematic diagram of a lateral color of the camera optical lens shown in FIG. 1.
Figure 4:
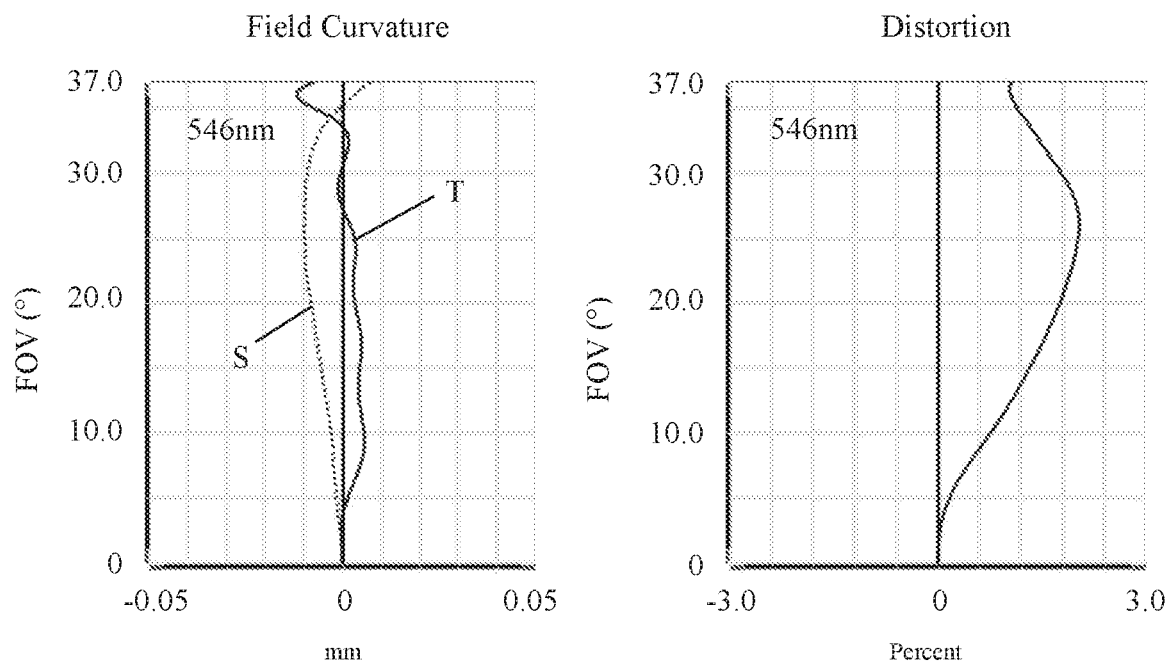
FIG. 4 is a schematic diagram of a field curvature and a distortion of the camera optical lens shown in FIG. 1.
Figure 5:
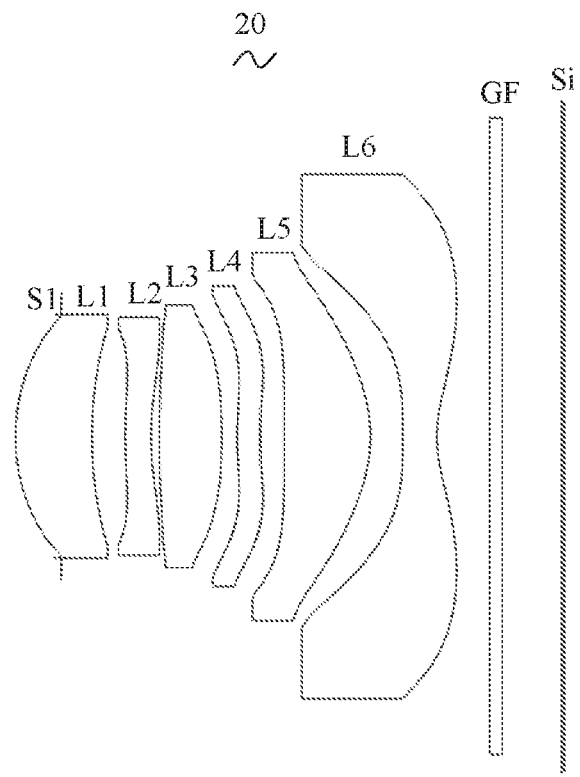
FIG. 5 is a schematic diagram of a structure of a camera optical lens in accordance with Embodiment 2 of the present disclosure.

FIG. 2 and FIG. 3 illustrate a longitudinal aberration and a lateral color of light with wavelengths of 486 nm, 588 nm, 656 nm after passing the camera optical lens 10 according to Embodiment 1. FIG. 4 illustrates a field curvature and a distortion of light with a wavelength of 546 nm after passing the camera optical lens 10 according to Embodiment 1, a field curvature S in FIG. 4 is a field curvature in a sagittal direction, T is a field curvature in a tangential direction.

The following Table 13 shows various values of Embodiments 1, 2, 3 and values corresponding to parameters which are already specified in the above conditions.

As shown in Table 13, Embodiment 1 satisfies the various conditions.

In this embodiment, the entrance pupil diameter of the camera optical lens is 2.261 mm, an image height of 1.0H is 2.911 mm, a FOV (field of view) in a diagonal direction is 74.02°. Thus, the camera optical lens has a wide-angle and is ultra-thin. Its on-axis and off-axis chromatic aberrations are fully corrected, thereby achieving excellent optical characteristics.

Embodiment 2

Embodiment 2 is basically the same as Embodiment 1 and involves symbols having the same meanings as Embodiment 1, and only differences therebetween will be described in the following.

Table 5 and table 6 show design data of a camera optical lens 20 in Embodiment 2 of the present disclosure.

TABLE 5

| | R | d | | nd | | vd | |
|---|---|---|---|---|---|---|---|
| S1 | ∞ | d0= | −0.404 | | | | |
| R1 | 1.678 | d1= | 0.679 | nd1 | 1.5467 | v1 | 55.82 |
| R2 | 3.363 | d2= | 0.295 | | | | |
| R3 | 3.789 | d3= | 0.230 | nd2 | 1.6686 | v2 | 20.53 |
| R4 | 2.481 | d4= | 0.075 | | | | |
| R5 | 19.370 | d5= | 0.553 | nd3 | 1.5467 | v3 | 55.82 |
| R6 | −5.721 | d6= | 0.138 | | | | |
| R7 | 3.117 | d7= | 0.200 | nd4 | 1.6422 | v4 | 23.83 |
| R8 | 3.169 | d8= | 0.211 | | | | |
| R9 | 1044.423 | d9= | 0.767 | nd5 | 1.5467 | v5 | 55.82 |
| R10 | −1.283 | d10= | 0.288 | | | | |
| R11 | −11.786 | d11= | 0.302 | nd6 | 1.5375 | v6 | 56.12 |
| R12 | 1.101 | d12= | 0.470 | | | | |
| R13 | ∞ | d13= | 0.110 | ndg | 1.5168 | vg | 64.17 |
| R14 | ∞ | d14= | 0.417 | | | | |

Table 6 shows aspherical surface data of each lens of the camera optical lens 20 in Embodiment 2 of the present disclosure.

TABLE 6

| | Conic Coefficient | Aspheric Surface Indexes | | | | |
|---|---|---|---|---|---|---|
| | k | A4 | A6 | A8 | A10 | A12 |
| R1 | 5.3805E−02 | 7.3359E−03 | 1.2156E−04 | −3.3667E−02 | 1.7628E−01 | −2.7674E−01 |
| R2 | 7.0106E+00 | −5.8154E−02 | 1.9815E−01 | −1.0552E+00 | 3.0002E+00 | −4.5750E+00 |
| R3 | 3.6314E+00 | −2.3169E−01 | 1.2441E−02 | −2.8839E−01 | 1.0707E+00 | −1.6871E+00 |
| R4 | −2.0799E+01 | 4.5584E−02 | −3.6132E−01 | 7.2199E−01 | −1.1070E+00 | 9.7373E−01 |
| R5 | 9.8995E+01 | 1.1115E−01 | −3.7351E−01 | 1.1794E+00 | −2.4801E+00 | 2.6545E+00 |
| R6 | 5.8405E+00 | −1.7822E−01 | 1.1541E−01 | 7.0161E−02 | −3.4188E−01 | 4.2875E−01 |
| R7 | −9.9000E+01 | −1.0006E−01 | −5.9895E−01 | 1.4858E+00 | −1.9364E+00 | 1.4484E+00 |
| R8 | −6.6678E+01 | −7.7693E−02 | −4.1330E−01 | 8.7706E−01 | −1.0053E+00 | 6.5704E−01 |
| R9 | −3.9537E+01 | −2.8546E−02 | −6.8146E−02 | 8.9008E−02 | −7.7927E−02 | 3.1295E−02 |
| R10 | −1.7104E+00 | 1.0925E−01 | −1.5571E−01 | 1.2530E−01 | −5.0929E−02 | 3.1633E−03 |
| R11 | 2.1678E+01 | −4.2478E−01 | 4.6457E−01 | −5.0779E−01 | 4.5275E−01 | −2.9354E−01 |
| R12 | −6.7533E+00 | −1.9844E−01 | 1.7662E−01 | −1.1765E−01 | 5.4413E−02 | −1.7129E−02 |

TABLE 6-continued

| | | Aspheric Surface Indexes | | | |
|---|---|---|---|---|---|
| | | A14 | A16 | A14 | A16 |
| | R1 | 1.9819E−01 | −5.0706E−02 | −4.0321E−03 | 2.5088E−03 |
| | R2 | 3.5350E+00 | −1.0583E+00 | −1.8965E−02 | −1.7639E−02 |
| | R3 | 1.2928E+00 | −3.7522E−01 | 1.1976E−02 | −5.7118E−02 |
| | R4 | −3.1858E−01 | −1.4959E−02 | 9.8190E−04 | 4.1663E−03 |
| | R5 | −1.3273E+00 | 2.4614E−01 | −6.8737E−05 | 1.0377E−03 |
| | R6 | −2.6250E−01 | 6.8752E−02 | 1.0349E−04 | 1.2983E−05 |
| | R7 | −5.6338E−01 | 8.7108E−02 | 2.3051E−04 | 1.5868E−04 |
| | R8 | −2.2219E−01 | 3.0265E−02 | −5.1510E−05 | 7.9882E−05 |
| | R9 | −4.1627E−03 | −1.8745E−04 | 1.9139E−05 | 2.4177E−05 |
| | R10 | 3.9246E−03 | −7.5083E−04 | −4.4485E−06 | −5.3690E−06 |
| | R11 | 1.3267E−01 | −3.9970E−02 | 7.2465E−03 | −5.9181E−04 |
| | R12 | 3.5673E−03 | −4.6878E−04 | 3.5064E−05 | −1.1303E−06 |

Table 7 and table 8 show design data of inflexion points and arrest points of respective lens in the camera optical lens 20 according to Embodiment 2 of the present disclosure.

TABLE 7

| | Number of inflexion points | Inflexion point position 1 | Inflexion point position 1 |
|---|---|---|---|
| P1R1 | 0 | 0 | 0 |
| P1R2 | 1 | 0.915 | 0 |
| P2R1 | 1 | 0.315 | 0 |
| P2R2 | 1 | 0.495 | 0 |
| P3R1 | 2 | 0.645 | 0.855 |
| P3R2 | 1 | 1.035 | 0 |
| P4R1 | 2 | 0.265 | 1.075 |
| P4R2 | 2 | 0.305 | 1.145 |
| P5R1 | 2 | 0.055 | 1.335 |
| P5R2 | 2 | 1.305 | 1.585 |
| P6R1 | 2 | 1.425 | 1.655 |
| P6R2 | 2 | 0.465 | 2.285 |

TABLE 8

| | Number of arrest points | Arrest point position 1 |
|---|---|---|
| P1R1 | 0 | 0 |
| P1R2 | 0 | 0 |
| P2R1 | 1 | 0.545 |
| P2R2 | 1 | 1.005 |
| P3R1 | 0 | 0 |
| P3R2 | 0 | 0 |
| P4R1 | 1 | 0.475 |
| P4R2 | 1 | 0.535 |
| P5R1 | 1 | 0.095 |
| P5R2 | 0 | 0 |
| P6R1 | 0 | 0 |
| P6R2 | 1 | 1.185 |

Figure 6:
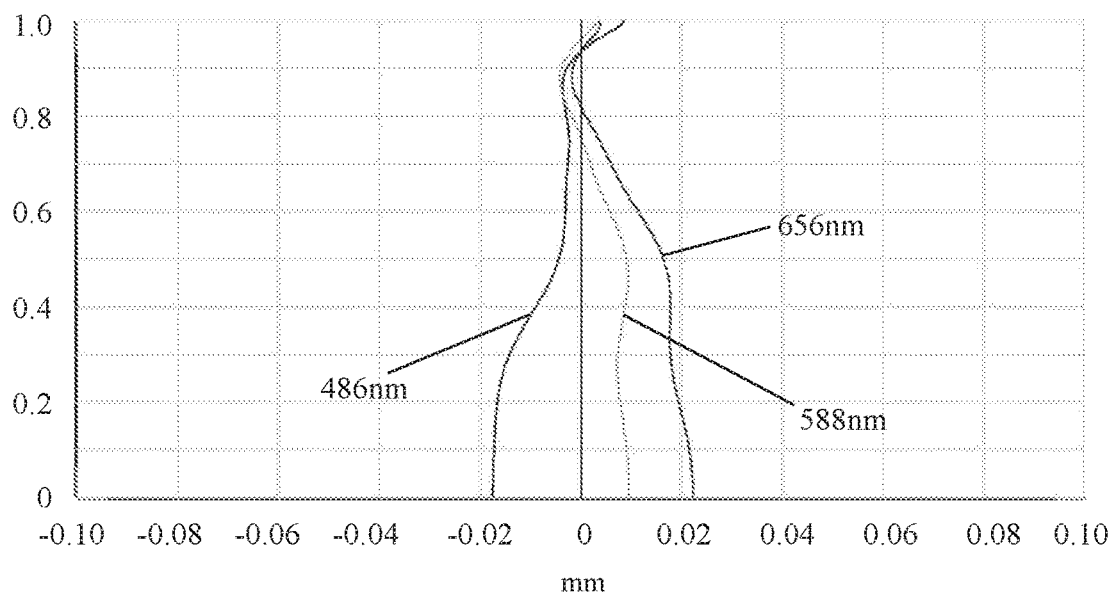
FIG. 6 is a schematic diagram of a longitudinal aberration of the camera optical lens shown in FIG. 5.
Figure 7:
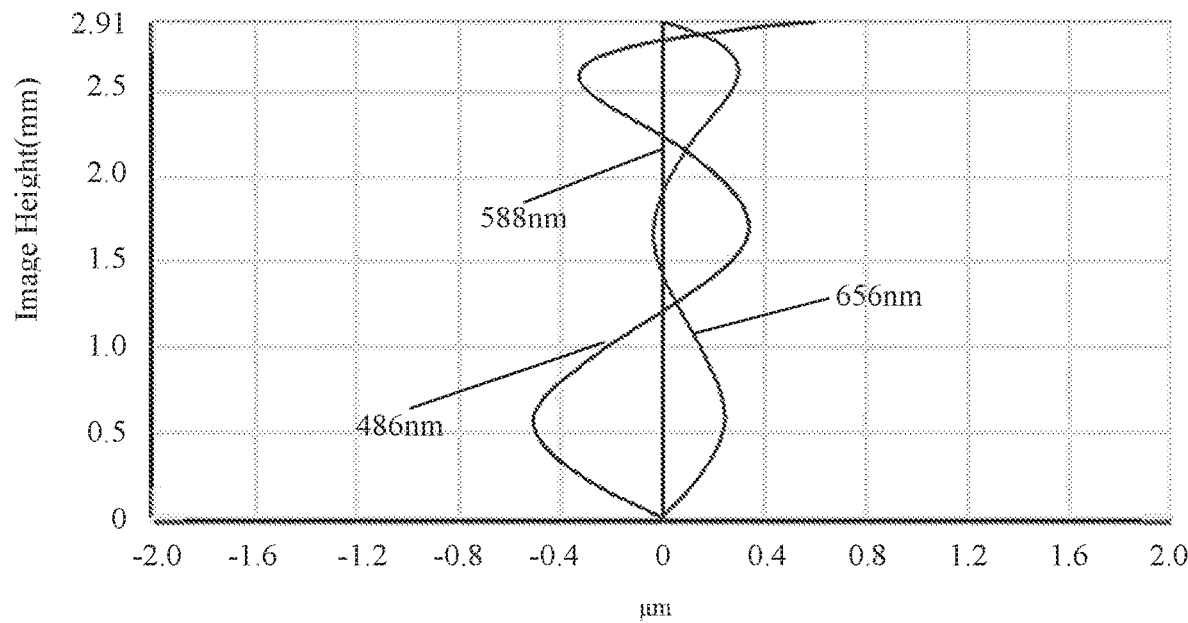
FIG. 7 is a schematic diagram of a lateral color of the camera optical lens shown in FIG. 5.
Figure 8:
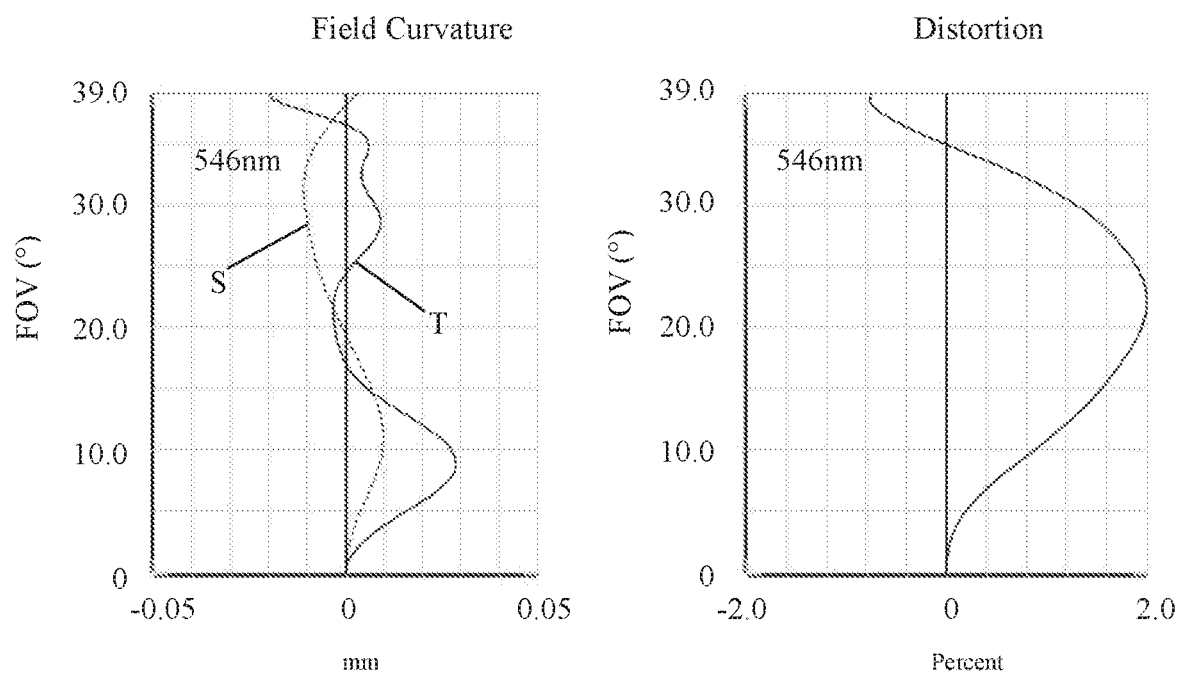
FIG. 8 is a schematic diagram of a field curvature and a distortion of the camera optical lens shown in FIG. 5.
Figure 9:
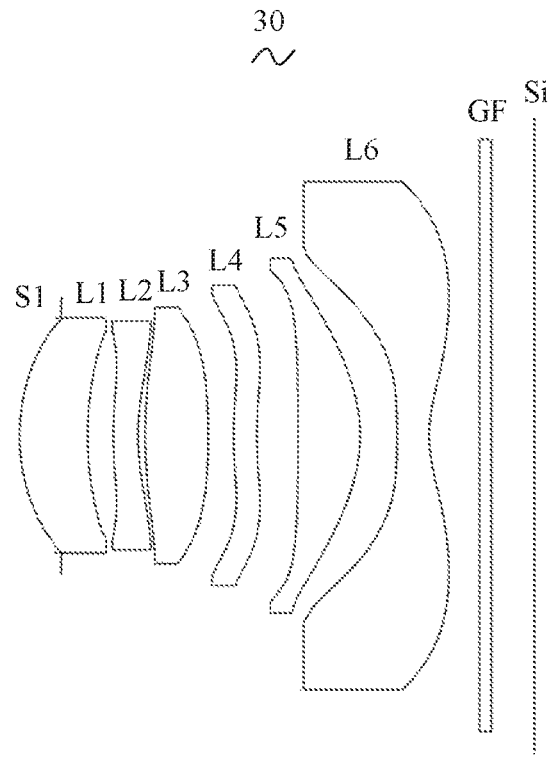
FIG. 9 is a schematic diagram of a structure of a camera optical lens in accordance with Embodiment 3 of the present disclosure.

FIG. 6 and FIG. 7 illustrate a longitudinal aberration and a lateral color of light with wavelengths of 486 nm, 588 nm and 656 nm after passing the camera optical lens 20 according to Embodiment 2. FIG. 8 illustrates a field curvature and a distortion of light with a wavelength of 546 nm after passing the camera optical lens 20 according to Embodiment 2.

As shown in Table 13, Embodiment 2 satisfies the above conditions.

In this embodiment, the entrance pupil diameter of the camera optical lens is 2.141 mm. An image height of 1.0 H is 2.911 mm, a FOV (field of view) in the diagonal direction is 78.06°. Thus, the camera optical lens has a wide-angle and is ultra-thin. Its on-axis and off-axis chromatic aberrations are fully corrected, thereby achieving excellent optical characteristics.

Embodiment 3

Embodiment 3 is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

TABLE 9

| | R | d | | nd | vd |
|---|---|---|---|---|---|
| S1 | ∞ | d0= | −0.390 | | |
| R1 | 1.777 | d1= | 0.634 | nd1 1.5467 | v1 55.82 |
| R2 | 2.867 | d2= | 0.240 | | |
| R3 | 3.238 | d3= | 0.230 | nd2 1.6686 | v2 20.53 |
| R4 | 2.092 | d4= | 0.068 | | |
| R5 | 5.004 | d5= | 0.585 | nd3 1.5467 | v3 55.82 |
| R6 | −7.825 | d6= | 0.238 | | |
| R7 | 2.941 | d7= | 0.218 | nd4 1.6422 | v4 23.83 |
| R8 | 3.185 | d8= | 0.375 | | |
| R9 | −796.577 | d9= | 0.583 | nd5 1.5467 | v5 55.82 |
| R10 | −1.353 | d10= | 0.344 | | |
| R11 | −11.818 | d11= | 0.300 | nd6 1.5375 | v6 56.12 |
| R12 | 1.149 | d12= | 0.470 | | |
| R13 | ∞ | d13= | 0.110 | ndg 1.5168 | vg 64.17 |
| R14 | ∞ | d14= | 0.405 | | |

Table 10 shows aspherical surface data of each lens of the camera optical lens 30 in Embodiment 3 of the present disclosure.

TABLE 10

| | Conic Coefficient | Aspheric Surface Indexes | | | | |
|---|---|---|---|---|---|---|
| | k | A4 | A6 | A8 | A10 | A12 |
| R1 | 7.4903E−02 | 6.3050E−03 | −2.1180E−02 | 1.2998E−01 | −3.6096E−01 | 6.8806E−01 |
| R2 | 4.7337E+00 | −5.0606E−02 | −9.7752E−03 | 1.9994E−01 | −9.0210E−01 | 2.4407E+00 |
| R3 | 3.4764E+00 | −2.3393E−01 | 6.7134E−02 | −3.3787E−01 | 1.2610E+00 | −2.4891E+00 |
| R4 | −1.2835E+01 | 1.7224E−03 | −1.1871E−01 | −1.5313E−02 | 5.1869E−01 | −1.1722E+00 |

TABLE 10-continued

| | | | | | |
|---|---|---|---|---|---|
| R5 | −5.8169E+01 | 6.3849E−02 | −1.0880E−02 | −1.8830E−01 | 4.2683E−01 | −8.5758E−01 |
| R6 | 1.6261E+01 | −1.5838E−01 | 2.0327E−01 | −3.8580E−01 | 5.8005E−01 | −6.4641E−01 |
| R7 | −4.6335E+01 | −1.0954E−01 | −2.1619E−01 | 4.2379E−01 | −3.9815E−01 | 1.1676E−01 |
| R8 | −3.9323E+01 | −9.7651E−02 | −1.4756E−01 | 2.7655E−01 | −2.3286E−01 | 8.1827E−02 |
| R9 | −9.9000E+01 | 3.9244E−03 | −9.8981E−02 | 1.4218E−01 | −1.6856E−01 | 2.0986E−01 |
| R10 | −1.6780E+00 | 1.4486E−01 | −3.5574E−01 | 6.3397E−01 | −8.6611E−01 | 8.4818E−01 |
| R11 | 3.1635E+01 | −3.4075E−01 | 1.7533E−01 | 3.5052E−02 | −1.6288E−01 | 1.6979E−01 |
| R12 | −6.1077E+00 | −2.0294E−01 | 1.7535E−01 | −1.0811E−01 | 4.6768E−02 | −1.4183E−02 |

| | Aspheric Surface Indexes | | | |
|---|---|---|---|---|
| | A14 | A16 | A14 | A16 |
| R1 | −8.5147E−01 | 6.6505E−01 | −2.9523E−01 | 5.7480E−02 |
| R2 | −4.0917E+00 | 4.2237E+00 | −2.4677E+00 | 6.3658E−01 |
| R3 | 3.0078E+00 | −2.2996E+00 | 1.0330E+00 | −2.0843E−01 |
| R4 | 1.5898E+00 | −1.4532E+00 | 7.8993E−01 | −1.8504E−01 |
| R5 | 1.4844E+00 | −1.6685E+00 | 9.9368E−01 | −2.3390E−01 |
| R6 | 4.3676E−01 | −1.2294E−01 | −2.3900E−02 | 1.7572E−02 |
| R7 | 8.9268E−02 | −7.3570E−02 | 1.5732E−02 | −3.1812E−04 |
| R8 | −5.8753E−03 | 8.6639E−03 | −9.0877E−03 | 2.1338E−03 |
| R9 | −1.8900E−01 | 9.7175E−02 | −2.5866E−02 | 2.7959E−03 |
| R10 | −5.3588E−01 | 2.0173E−01 | −4.0805E−02 | 3.4045E−03 |
| R11 | −1.0356E−01 | 3.7619E−02 | −7.3177E−03 | 5.8069E−04 |
| R12 | 2.9171E−03 | −3.8382E−04 | 2.8918E−05 | −9.4237E−07 |

Table 11 and table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 |
|---|---|---|---|
| P1R1 | 0 | 0 | 0 |
| P1R2 | 0 | 0 | 0 |
| P2R1 | 1 | 0.355 | 0 |
| P2R2 | 1 | 0.565 | 0 |
| P3R1 | 2 | 0.725 | 1.005 |
| P3R2 | 1 | 1.115 | 0 |
| P4R1 | 2 | 0.325 | 1.145 |
| P4R2 | 2 | 0.345 | 1.255 |
| P5R1 | 1 | 1.495 | 0 |
| P5R2 | 1 | 1.355 | 0 |
| P6R1 | 1 | 1.415 | 0 |
| P6R2 | 1 | 0.475 | 0 |

TABLE 12

| | Number of inflexion points | Inflexion point position |
|---|---|---|
| P1R1 | 0 | 0 |
| P1R2 | 0 | 0 |
| P2R1 | 1 | 0.625 |
| P2R2 | 0 | 0 |
| P3R1 | 0 | 0 |
| P3R2 | 0 | 0 |
| P4R1 | 1 | 0.575 |
| P4R2 | 1 | 0.625 |
| P5R1 | 0 | 0 |
| P5R2 | 0 | 0 |
| P6R1 | 0 | 0 |
| P6R2 | 1 | 1.255 |

Figure 10:
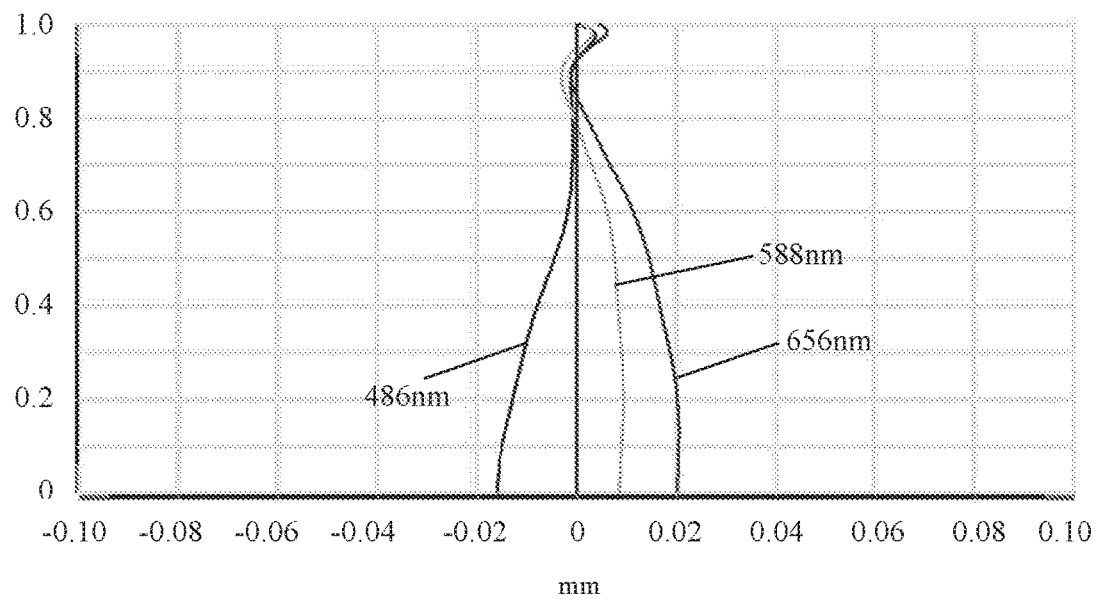
FIG. 10 is a schematic diagram of a longitudinal aberration of the camera optical lens shown in FIG. 9.
Figure 11:
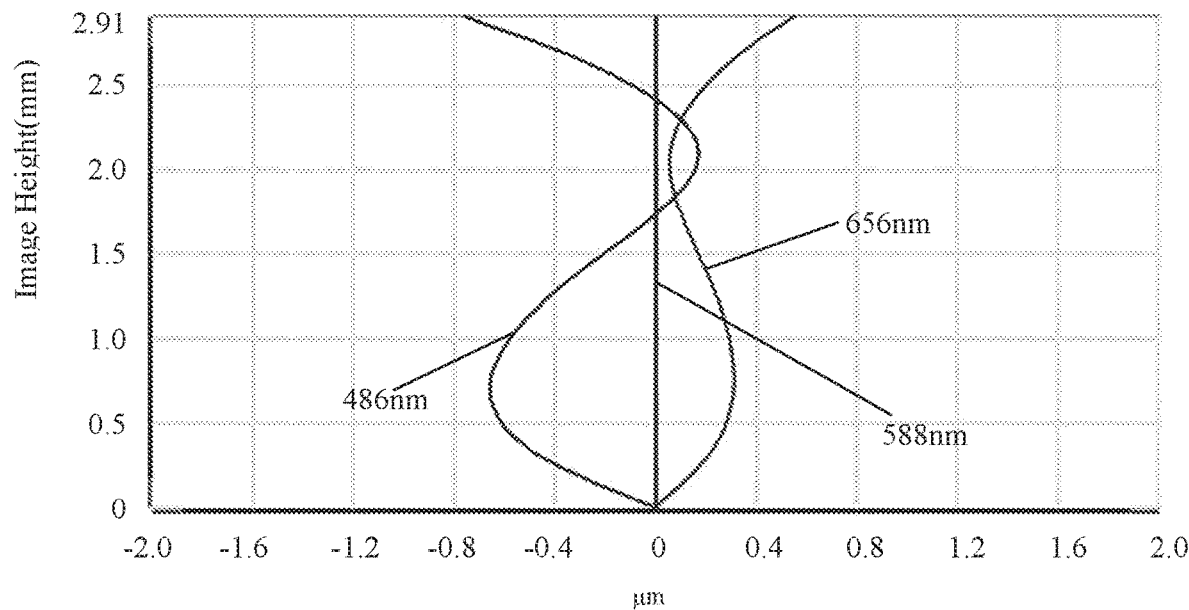
FIG. 11 is a schematic diagram of a lateral color of the camera optical lens shown in FIG. 9.
Figure 12:
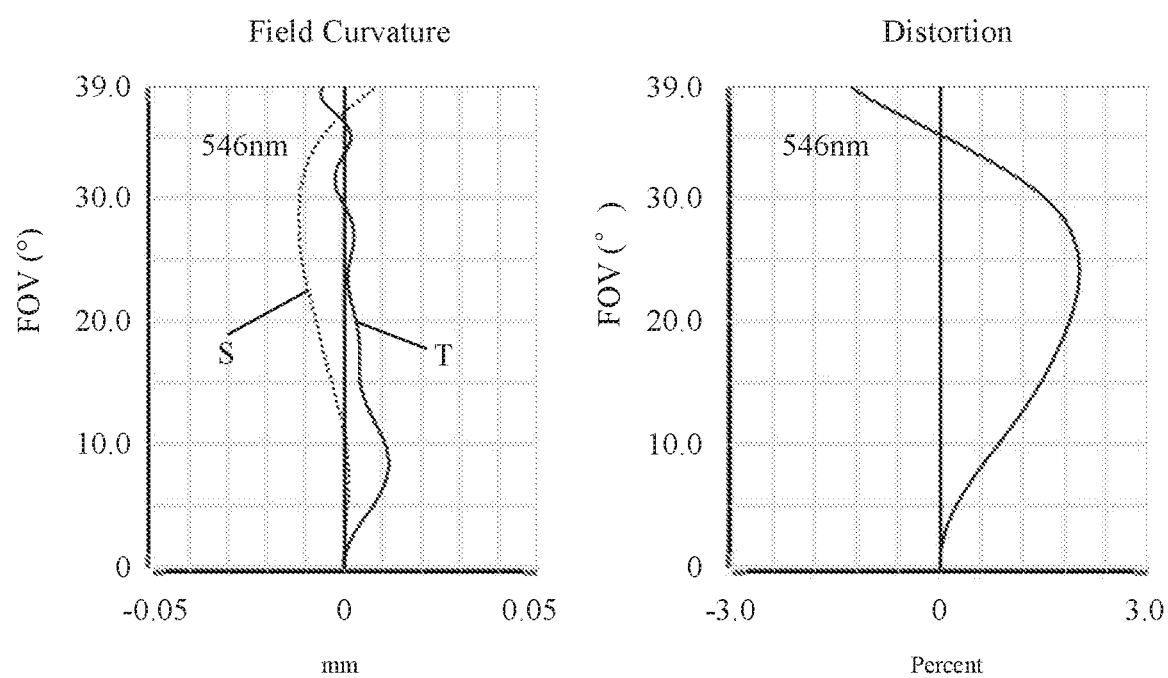
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 486 nm, 588 nm and 656 nm after passing the camera optical lens 30 according to Embodiment 3. FIG. 12 illustrates field curvature and distortion of light with a wavelength of 546 nm after passing the camera optical lens 30 according to Embodiment 3.

The following Table 13 shows the values corresponding to the conditions in this embodiment according to the above conditions. Obviously, this embodiment satisfies the various conditions.

In this embodiment, a pupil entering diameter of the camera optical lens is 2.152 mm, an image height of 1.0 H is 2.911 mm, and a FOV in the diagonal direction is 78.06°. Thus, the camera optical lens has a wide-angle and is ultra-thin. Its on-axis and off-axis chromatic aberrations are fully corrected, thereby achieving excellent optical characteristics.

TABLE 13

| Parameters and conditions | Embodiment 1 | Embodiment 2 | Embodiment 3 |
|---|---|---|---|
| f | 3.821 | 3.618 | 3.637 |
| f1 | 5.158 | 5.359 | 7.092 |
| f2 | −6.847 | −11.560 | −9.620 |
| f3 | 6.551 | 8.141 | 5.674 |
| f4 | 38.766 | 117.777 | 44.272 |
| f5 | 2.596 | 2.345 | 2.479 |
| f6 | −1.925 | −1.858 | −1.932 |
| f12 | 11.890 | 8.053 | 16.698 |
| FNO | 1.69 | 1.69 | 1.69 |
| f1/f | 1.35 | 1.48 | 1.95 |
| R7/d7 | 13.55 | 15.59 | 13.49 |

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, comprising, from an object side to an image side in sequence: a first lens, a second lens, a third lens, a fourth lens, a fifth lens and a sixth lens; wherein, the first lens has a positive refractive power, the second lens has a negative refractive power, the third lens has a positive refractive power, the fourth lens has a positive refractive power, the fifth lens has a positive refractive power, and the sixth lens has a negative refractive power; wherein, an object side surface of the fourth lens is convex in a paraxial region, and an image side surface of the fourth lens is concave in the paraxial region;

wherein, the camera optical lens satisfies the following conditions:

1.30≤f1/f≤2.00; and
13.00≤R7/d7≤16.00;
5.07≤f4/f≤48.82;
−240.44≤(R7+R8)/(R7−R8)≤−9.42; and
0.02≤d7/TTL≤0.09, where, f denotes a focus length of the camera optical lens;
f1 denotes a focus length of the first lens;
R7 denotes a curvature radius of an object side surface of the fourth lens;
d7 denotes an on-axis thickness of the fourth lens is d7;
f4 denotes a focus length of the fourth lens;
R8 denotes a curvature radius of the image side surface of the fourth lens; and
TTL denotes a total optical length from an object side surface of the first lens to an image surface of the camera optical lens along an optical axis.

2. The camera optical lens according to claim 1 further satisfying the following conditions:

1.32≤f1/f≤1.98; and
13.25≤R7/d7≤15.79.

3. The camera optical lens according to claim 1, wherein the first lens has a positive refractive power, an object side surface of the first lens is convex in a paraxial region, and an image side surface of the first lens is concave in the paraxial region, wherein, the camera optical lens satisfies the following conditions:
−8.52≤(R1+R2)/(R1−R2)≤−1.81; and
0.07≤d1/TTL≤0.22;

where,

R2 denotes a curvature radius of the image side surface of the first lens;
d1 denotes an on-axis thickness of the first lens; and
TTL denotes a total optical length from the object side surface of the first lens to an image surface of the camera optical lens along an optical axis.

4. The camera optical lens according to claim 3 further satisfying the following conditions:

−5.33≤(R1+R2)/(R1−R2)≤−2.27; and
0.11≤d1/TTL≤0.17.

5. The camera optical lens according to claim 1, wherein an object side surface of the second lens is convex in a paraxial region, and an image side surface of the second lens is concave in the paraxial region;

wherein, the camera optical lens satisfies the following conditions:
−6.39≤f2/f≤−1.19;
1.39≤(R3+R4)/(R3−R4)≤7.19; and
0.02≤d3/TTL≤0.07, where, f2 denotes a focus length of the second lens;
R3 denotes a curvature radius of the object side surface of the second lens;
R4 denotes a curvature radius of the image side surface of the second lens;
d3 denotes an on-axis thickness of the second lens; and
TTL denotes a total optical length from an object side surface of the first lens to an image surface of the camera optical lens along an optical axis.

6. The camera optical lens according to claim 5 further satisfying the following conditions:

−3.99≤f2/f≤−1.49;
2.23≤(R3+R4)/(R3−R4)≤5.75; and
0.04≤d3/TTL≤0.06.

7. The camera optical lens according to claim 1, wherein, an object side surface of the third lens is convex in a paraxial region, and an image side surface of the third lens is convex in the paraxial region;

wherein, the camera optical lens further satisfies the following conditions:
0.78≤f3/f≤3.37;
−1.12≤(R5+R6)/(R5−R6)≤0.82; and
0.05≤d5/TTL≤0.18, where, f3 denotes a focus length of the third lens;
R5 denotes a curvature radius of the object side surface of the third lens;
R6 denotes a curvature radius of the image side surface of the third lens;
d5 denotes an on-axis thickness of the third lens; and
TTL denotes a total optical length from an object side surface of the first lens to an image surface of the camera optical lens along an optical axis.

8. The camera optical lens according to claim 7 further satisfying the following conditions:

1. 25≤f3/f≤2.70;
−0.70≤(R5+R6)/(R5−R6)≤0.65; and
0.08≤d5/TTL≤0.15.

9. The camera optical lens according to claim 1 further satisfying the following conditions:

8.12≤f4/f≤39.06;
−150.27≤(R7+R8)/(R7−R8)≤−11.77; and
0.03≤d7/TT≤0.07.

10. The camera optical lens according to claim 1, wherein, a fifth lens has a positive refractive power, and an image side surface of the fifth lens is convex in a paraxial region, where, the camera optical lens further satisfies the following conditions:
0.32≤f5/f≤1.02;
0.41≤(R9+R10)/(R9−R10)≤1.51; and
0.06≤d9/TTL≤0.24, where, f5 denotes a focus length of the fifth lens;
R9 denotes a curvature radius of an object side surface of the fifth lens;
R10 denotes a curvature radius of the image side surface of the fifth lens;
d9 denotes an on-axis thickness of the fifth lens; and
TTL denotes a total optical length from an object side surface of the first lens to an image surface of the camera optical lens along an optical axis.

11. The camera optical lens according to claim 10 further satisfying the following conditions:

0.52≤f5/f≤0.82;
0.65≤(R9+R10)/(R9−R10)≤1.20; and
0.09≤d9/TTL≤0.19.

12. The camera optical lens according to claim 1, wherein, the sixth lens has a negative refractive power, an object side surface of the sixth lens is concave in a paraxial region, and an image side surface of the sixth lens is concave in the paraxial region, wherein, the camera optical lens satisfies the following conditions:
−1.06≤f6/f≤−0.34;
0.41≤(R11+R12)/(R11−R12)≤1.24; and
0.03≤d11/TTL≤0.10, where, f6 denotes a focus length of the sixth lens;
R11 denotes a curvature radius of the object side surface of the sixth lens;

R12 denotes a curvature radius of the image side surface of the sixth lens;

d11 denotes an on-axis thickness of the sixth lens; and

TTL denotes a total optical length from an object side surface of the first lens to an image surface of the camera optical lens along an optical axis.

13. The camera optical lens according to claim 12 further satisfying the following conditions:

$-0.66 \leq f6/f \leq -0.42$;

$0.66 \leq (R11+R12)/(R11-R12) \leq 0.99$; and $0.05 \leq d11/TTL \leq 0.08$.

14. The camera optical lens according to claim 1, wherein a combined focal length f12 of the first lens and the second lens satisfies the following condition:

$1.11 \leq f12/f \leq 6.89$.

15. The camera optical lens according to claim 14, further satisfiying the following conditions:

$1.78 \leq f12/f \leq 5.51$.

16. The camera optical lens according to claim 1, wherein a total optical length TTL from an object side surface of the first lens to an image surface of the camera optical lens along an optical axis is less than or equal to 5.28 mm.

17. The camera optical lens according to claim 16, wherein the total optical length TTL of the camera optical lens is less than or equal to 5.04 mm.

18. The camera optical lens according to claim 1, wherein an F number of the camera optical lens is less than or equal to 1.74.

19. The camera optical lens according to claim 18, wherein the F number of the camera optical lens is less than or equal to 1.71.

\* \* \* \* \*